(12) United States Patent
Günther et al.

(10) Patent No.: US 11,097,471 B2
(45) Date of Patent: Aug. 24, 2021

(54) METHOD AND DEVICE FOR 3D PRINTING USING TEMPERATURE-CONTROLLED PROCESSING

(71) Applicant: VOXELJET AG, Friedberg (DE)

(72) Inventors: Daniel Günther, Munich (DE);
Johannes Günther, Martinsried (DE);
Ingo Gnüchtel, Villenbach (DE);
Massimo Russo, Augsburg (DE)

(73) Assignee: VOXELJET AG, Friedberg (DE)

( * ) Notice: Subject to any disclaimer, the term of this patent is extended or adjusted under 35 U.S.C. 154(b) by 317 days.

(21) Appl. No.: 15/128,640

(22) PCT Filed: Mar. 27, 2015

(86) PCT No.: PCT/DE2015/000151
§ 371 (c)(1),
(2) Date: Sep. 23, 2016

(87) PCT Pub. No.: WO2015/149742
PCT Pub. Date: Oct. 8, 2015

(65) Prior Publication Data
US 2017/0106595 A1    Apr. 20, 2017

(30) Foreign Application Priority Data

Mar. 31, 2014    (DE) .................... 10 2014 004 692.3

(51) Int. Cl.
| | |
|---|---|
| *B29C 64/165* | (2017.01) |
| *B33Y 10/00* | (2015.01) |
| *B33Y 30/00* | (2015.01) |
| *B33Y 40/00* | (2020.01) |
| *B33Y 50/02* | (2015.01) |

(52) U.S. Cl.
CPC ............ *B29C 64/165* (2017.08); *B33Y 10/00* (2014.12); *B33Y 30/00* (2014.12); *B33Y 40/00* (2014.12); *B33Y 50/02* (2014.12)

(58) Field of Classification Search
CPC ......... B33Y 50/02; B33Y 30/00; B33Y 10/00; B33Y 40/00; B29C 64/165; B29C 64/386;
(Continued)

(56) References Cited

U.S. PATENT DOCUMENTS

| | | |
|---|---|---|
| 3,913,503 A | 10/1975 | Becker |
| 4,247,508 A | 1/1981 | Housholder |

(Continued)

FOREIGN PATENT DOCUMENTS

| | | |
|---|---|---|
| AU | 720255 B2 | 5/2000 |
| CN | 101146666 A | 3/2008 |

(Continued)

OTHER PUBLICATIONS

US 4,937,420 A, 06/1990, Deckard (withdrawn)
(Continued)

*Primary Examiner* — Leith S Shafi
(74) *Attorney, Agent, or Firm* — The Dobrusin Law Firm, P.C.

(57) ABSTRACT

The invention relates to a method for producing 3D components, particulate material being applied in layers to a building platform in a closed build space and printing fluid being selectively applied, and these steps being repeated until a three-dimensional component is obtained, the relative humidity or the relative solvent concentration in the atmosphere in the build space being set to a selected value, and/or the temperature in the build space being set to a selected temperature.

17 Claims, 5 Drawing Sheets

(58) Field of Classification Search
CPC ........ B28B 1/001; G05D 22/00; G03G 21/20; B22F 3/1055
See application file for complete search history.

(56) References Cited

U.S. PATENT DOCUMENTS

| | | | |
|---|---|---|---|
| 4,575,330 A | 3/1986 | Hull | |
| 4,591,402 A | 5/1986 | Evans et al. | |
| 4,600,733 A | 7/1986 | Ohashi et al. | |
| 4,665,492 A | 5/1987 | Masters | |
| 4,669,634 A | 6/1987 | Leroux | |
| 4,711,669 A | 12/1987 | Paul et al. | |
| 4,752,352 A | 6/1988 | Feygin | |
| 4,752,498 A | 6/1988 | Fudim | |
| 4,863,538 A | 9/1989 | Deckard | |
| 4,938,816 A | 7/1990 | Beaman et al. | |
| 4,944,817 A | 7/1990 | Bourell et al. | |
| 5,017,753 A | 5/1991 | Deckard | |
| 5,031,120 A | 7/1991 | Pomerantz et al. | |
| 5,047,182 A | 9/1991 | Sundback et al. | |
| 5,053,090 A | 10/1991 | Beaman et al. | |
| 5,059,266 A | 10/1991 | Yamane et al. | |
| 5,076,869 A | 12/1991 | Bourell et al. | |
| 5,120,476 A | 6/1992 | Scholz | |
| 5,126,529 A | 6/1992 | Weiss et al. | |
| 5,127,037 A | 6/1992 | Bynum | |
| 5,132,143 A | 7/1992 | Deckard | |
| 5,134,569 A | 7/1992 | Masters | |
| 5,136,515 A | 8/1992 | Helinski | |
| 5,140,937 A | 8/1992 | Yamane et al. | |
| 5,147,587 A | 9/1992 | Marcus et al. | |
| 5,149,548 A | 9/1992 | Yamane et al. | |
| 5,155,324 A | 10/1992 | Deckard et al. | |
| 5,156,697 A | 10/1992 | Bourell et al. | |
| 5,182,170 A | 1/1993 | Marcus et al. | |
| 5,204,055 A | 4/1993 | Sachs et al. | |
| 5,216,616 A | 6/1993 | Masters | |
| 5,229,209 A | 7/1993 | Gharapetian et al. | |
| 5,248,456 A | 8/1993 | Evans, Jr. et al. | |
| 5,252,264 A | 10/1993 | Forderhase et al. | |
| 5,263,130 A | 11/1993 | Pomerantz et al. | |
| 5,269,982 A | 12/1993 | Brotz | |
| 5,284,695 A | 2/1994 | Barlow et al. | |
| 5,296,062 A | 3/1994 | Bourell et al. | |
| 5,316,580 A | 5/1994 | Deckard | |
| 5,324,617 A | 6/1994 | Majima et al. | |
| 5,340,656 A | 8/1994 | Sachs et al. | |
| 5,342,919 A | 8/1994 | Dickens, Jr. et al. | |
| 5,352,405 A | 10/1994 | Beaman et al. | |
| 5,354,414 A | 10/1994 | Feygin | |
| 5,382,308 A | 1/1995 | Bourell et al. | |
| 5,387,380 A | 2/1995 | Cima et al. | |
| 5,398,193 A | 3/1995 | deAngelis | |
| 5,418,112 A | 5/1995 | Mirle et al. | |
| 5,427,722 A | 6/1995 | Fouts et al. | |
| 5,431,967 A | 7/1995 | Manthiram et al. | |
| 5,433,261 A | 7/1995 | Hinton | |
| 5,482,659 A | 1/1996 | Sauerhoefer | |
| 5,490,962 A | 2/1996 | Cima et al. | |
| 5,503,785 A | 4/1996 | Crump et al. | |
| 5,506,607 A | 4/1996 | Sanders, Jr. et al. | |
| 5,518,060 A | 5/1996 | Cleary et al. | |
| 5,518,680 A | 5/1996 | Cima et al. | |
| 5,555,176 A | 9/1996 | Menhennett et al. | |
| 5,573,721 A | 11/1996 | Gillette | |
| 5,589,222 A | 12/1996 | Thometzek et al. | |
| 5,597,589 A | 1/1997 | Deckard | |
| 5,616,294 A | 4/1997 | Deckard | |
| 5,616,631 A | 4/1997 | Kiuchi et al. | |
| 5,637,175 A | 6/1997 | Feygin et al. | |
| 5,639,070 A | 6/1997 | Deckard | |
| 5,639,402 A | 6/1997 | Barlow et al. | |
| 5,647,931 A | 7/1997 | Retallick et al. | |
| 5,658,412 A | 8/1997 | Retallick et al. | |
| 5,665,401 A | 9/1997 | Serbin et al. | |
| 5,717,599 A | 2/1998 | Menhennett et al. | |
| 5,730,925 A | 3/1998 | Mattes et al. | |
| 5,740,051 A | 4/1998 | Sanders, Jr. et al. | |
| 5,747,105 A | 5/1998 | Haubert | |
| 5,749,041 A | 5/1998 | Lakshminarayan et al. | |
| 5,753,274 A | 5/1998 | Wilkening et al. | |
| 5,807,437 A | 9/1998 | Sachs et al. | |
| 5,837,960 A | 11/1998 | Lewis et al. | |
| 5,851,465 A | 12/1998 | Bredt | |
| 5,884,688 A | 3/1999 | Hinton et al. | |
| 5,902,441 A | 5/1999 | Bredt et al. | |
| 5,902,537 A | 5/1999 | Almquist et al. | |
| 5,904,889 A | 5/1999 | Serbin et al. | |
| 5,934,343 A | 8/1999 | Gaylo et al. | |
| 5,940,674 A * | 8/1999 | Sachs .................. | B22F 3/115 419/2 |
| 5,943,235 A | 8/1999 | Earl et al. | |
| 5,989,476 A | 11/1999 | Lockard et al. | |
| 5,997,795 A | 12/1999 | Danforth | |
| 6,007,318 A | 12/1999 | Russell et al. | |
| 6,036,777 A | 3/2000 | Sachs | |
| 6,042,774 A | 3/2000 | Wilkening et al. | |
| 6,048,188 A | 4/2000 | Hull et al. | |
| 6,048,954 A | 4/2000 | Barlow et al. | |
| 6,133,353 A | 10/2000 | Bui et al. | |
| 6,146,567 A | 11/2000 | Sachs et al. | |
| 6,147,138 A | 11/2000 | Hochsmann et al. | |
| 6,155,331 A | 12/2000 | Langer et al. | |
| 6,164,850 A | 12/2000 | Speakman | |
| 6,165,406 A | 12/2000 | Jang et al. | |
| 6,169,605 B1 | 1/2001 | Penn et al. | |
| 6,175,422 B1 | 1/2001 | Penn et al. | |
| 6,193,922 B1 | 2/2001 | Ederer | |
| 6,210,625 B1 | 4/2001 | Matsushita | |
| 6,216,508 B1 | 4/2001 | Matsubara et al. | |
| 6,217,816 B1 | 4/2001 | Tang | |
| 6,259,962 B1 | 7/2001 | Gothait | |
| 6,270,335 B2 | 8/2001 | Leyden et al. | |
| 6,305,769 B1 | 10/2001 | Thayer et al. | |
| 6,316,060 B1 | 11/2001 | Elvidge et al. | |
| 6,318,418 B1 | 11/2001 | Grossmann et al. | |
| 6,335,052 B1 | 1/2002 | Suzuki et al. | |
| 6,335,097 B1 | 1/2002 | Otsuka et al. | |
| 6,350,495 B1 | 2/2002 | Schriener et al. | |
| 6,355,196 B1 | 3/2002 | Kotnis et al. | |
| 6,375,874 B1 | 4/2002 | Russell et al. | |
| 6,395,811 B1 | 5/2002 | Nguyen et al. | |
| 6,401,001 B1 | 6/2002 | Jang et al. | |
| 6,403,002 B1 | 6/2002 | Van Der Geest | |
| 6,405,095 B1 | 6/2002 | Jang et al. | |
| 6,416,850 B1 | 7/2002 | Bredt et al. | |
| 6,423,255 B1 | 7/2002 | Hoechsmann et al. | |
| 6,460,979 B1 | 10/2002 | Heinzl et al. | |
| 6,476,122 B1 | 11/2002 | Leyden | |
| 6,485,831 B1 | 11/2002 | Fukushima et al. | |
| 6,500,378 B1 | 12/2002 | Smith | |
| 6,554,600 B1 | 4/2003 | Hofmann et al. | |
| 6,596,224 B1 | 7/2003 | Sachs et al. | |
| 6,610,429 B2 | 8/2003 | Bredt et al. | |
| 6,616,030 B2 | 9/2003 | Miller | |
| 6,658,314 B1 | 12/2003 | Gothait | |
| 6,672,343 B1 | 1/2004 | Perret et al. | |
| 6,713,125 B1 | 3/2004 | Sherwood et al. | |
| 6,722,872 B1 | 4/2004 | Swanson et al. | |
| 6,733,528 B2 | 5/2004 | Abe et al. | |
| 6,742,456 B1 | 6/2004 | Kasperchik et al. | |
| 6,764,636 B1 | 7/2004 | Allanic et al. | |
| 6,767,499 B1 * | 7/2004 | Hory .................. | B22F 3/1055 264/497 |
| 6,827,988 B2 | 12/2004 | Krause et al. | |
| 6,830,643 B1 | 12/2004 | Hayes | |
| 6,838,035 B1 | 1/2005 | Ederer et al. | |
| 6,855,205 B2 | 2/2005 | McQuate et al. | |
| 6,896,839 B2 | 5/2005 | Kubo et al. | |
| 6,905,645 B2 * | 6/2005 | Iskra .................... | B22F 3/1055 264/128 |
| 6,972,115 B1 | 12/2005 | Ballard | |
| 6,989,115 B2 | 1/2006 | Russell et al. | |
| 7,004,222 B2 | 2/2006 | Ederer et al. | |

(56) References Cited

U.S. PATENT DOCUMENTS

| | | |
|---|---|---|
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Fan et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom et al. |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0280185 A1 | 12/2005 | Russell et al. |
| 2005/0283136 A1 | 12/2005 | Skarda |
| 2006/0013659 A1 | 1/2006 | Pfeiffer et al. |
| 2006/0061618 A1 | 3/2006 | Hernandez et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0176346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0054143 A1 | 3/2007 | Otoshi |
| 2007/0057412 A1 | 3/2007 | Weiskopf et al. |
| 2007/0065397 A1 | 3/2007 | Ito et al. |
| 2007/0126157 A1 | 6/2007 | Bredt |
| 2007/0215020 A1 | 9/2007 | Miller |
| 2007/0238056 A1 | 10/2007 | Baumann et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2009/0102072 A1* | 4/2009 | Anderson ............. F24F 6/18 261/58 |
| 2009/0261497 A1 | 10/2009 | Ederer et al. |
| 2010/0007062 A1 | 1/2010 | Larsson et al. |
| 2010/0026743 A1 | 2/2010 | Van Thillo et al. |
| 2010/0152865 A1 | 6/2010 | Jonsson et al. |
| 2010/0207288 A1 | 8/2010 | Dini |
| 2010/0212584 A1 | 8/2010 | Ederer et al. |
| 2010/0243123 A1 | 9/2010 | Ederer et al. |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann et al. |

(56) References Cited

U.S. PATENT DOCUMENTS

| | | |
|---|---|---|
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer |
| 2012/0126457 A1 | 5/2012 | Abe et al. |
| 2012/0189102 A1 | 7/2012 | Maurer, Jr. et al. |
| 2012/0291701 A1 | 11/2012 | Grasegger et al. |
| 2012/0329943 A1 | 12/2012 | Hicks et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0157193 A1 | 6/2013 | Moritani et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Kim et al. |
| 2014/0212677 A1 | 7/2014 | Gnuchtel et al. |
| 2014/0227123 A1 | 8/2014 | Gunster |
| 2014/0236339 A1 | 8/2014 | Fagan |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grasegger et al. |
| 2016/0158828 A1 * | 6/2016 | Tanaka .................... B22C 9/02 164/12 |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2017/0028630 A1 | 2/2017 | Ederer et al. |
| 2017/0050378 A1 | 2/2017 | Ederer |
| 2017/0050387 A1 | 2/2017 | Ederer |
| 2017/0106595 A1 | 4/2017 | Gunther et al. |
| 2017/0136524 A1 | 5/2017 | Ederer et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0197367 A1 | 7/2017 | Ederer et al. |
| 2017/0210037 A1 | 7/2017 | Ederer et al. |
| 2017/0217098 A1 | 8/2017 | Hartmann et al. |
| 2017/0297263 A1 | 10/2017 | Ederer et al. |
| 2017/0305139 A1 | 10/2017 | Hartmann |
| 2017/0326693 A1 | 11/2017 | Ederer et al. |
| 2017/0355137 A1 | 12/2017 | Ederer et al. |
| 2018/0079133 A1 | 3/2018 | Ederer et al. |
| 2018/0141271 A1 | 5/2018 | Gunter et al. |
| 2018/0141272 A1 | 5/2018 | Hartmann et al. |
| 2018/0169758 A1 | 6/2018 | Ederer et al. |
| 2018/0222082 A1 | 8/2018 | Gunther et al. |
| 2018/0222174 A1 | 8/2018 | Guneter et al. |

FOREIGN PATENT DOCUMENTS

| | | | |
|---|---|---|---|
| DE | 3221357 A1 | 12/1983 | |
| DE | 3903750 C2 | 3/1991 | |
| DE | 4102260 A1 | 7/1992 | |
| DE | 4305201 C1 | 4/1994 | |
| DE | 4 325 573 | 2/1995 | |
| DE | 29506204 U1 | 6/1995 | |
| DE | 4440397 | 9/1995 | |
| DE | 19525307 A1 | 1/1997 | |
| DE | 19530295 C1 | 1/1997 | |
| DE | 19528215 A1 | 2/1997 | |
| DE | 29701279 U1 | 5/1997 | |
| DE | 19545167 A1 | 6/1997 | |
| DE | 69031808 T2 | 4/1998 | |
| DE | 19853834 | 5/2000 | |
| DE | 69634921 T2 | 12/2005 | |
| DE | 201 22 639 U1 | 11/2006 | |
| DE | 10 2006 040 305 A1 | 3/2007 | |
| DE | 102006029298 A1 | 12/2007 | |
| DE | 102007040755 A1 | 3/2009 | |
| DE | 102007047326 A1 | 4/2009 | |
| DE | 102011053205 A1 | 3/2013 | |
| DE | 102015006363 A1 | 12/2016 | |
| DE | 102015008860 A1 | 1/2017 | |
| DE | 102015011503 A1 | 3/2017 | |
| DE | 102015011790 A1 | 3/2017 | |
| EP | 0361847 B1 | 4/1990 | |
| EP | 0 431 924 A2 | 12/1990 | |
| EP | 1415792 | 5/2004 | |
| EP | 1457590 A | 9/2004 | |
| EP | 1381504 B1 | 8/2007 | |
| EP | 2305454 A1 | 4/2011 | |
| GB | 2297516 A | 8/1996 | |
| JP | S62275734 A | 11/1987 | |
| JP | 2003136605 A | 5/2003 | |
| JP | 2004082206 A | 3/2004 | |
| JP | 2009202451 A | 9/2009 | |
| WO | 98/28124 A2 | 7/1998 | |
| WO | 01/40866 A2 | 6/2001 | |
| WO | 01/078969 A2 | 10/2001 | |
| WO | 2004/005014 A2 | 1/2004 | |
| WO | 2004/014637 A1 | 2/2004 | |
| WO | 2006/100166 A1 | 9/2006 | |
| WO | 2007/114895 A2 | 10/2007 | |
| WO | WO-2007114895 A2 * | 10/2007 | ........... G03G 15/224 |
| WO | 2008/049384 A1 | 5/2008 | |
| WO | 2008061520 A2 | 5/2008 | |
| WO | 2011063786 A1 | 6/2011 | |
| WO | 2012/175072 A1 | 12/2012 | |
| WO | 2013075696 A1 | 5/2013 | |
| WO | 2014090207 A1 | 6/2014 | |
| WO | 2014166469 A1 | 10/2014 | |
| WO | 2015078430 A1 | 6/2015 | |
| WO | 2015081926 A1 | 6/2015 | |
| WO | 2015085983 A2 | 6/2015 | |
| WO | 2015090265 A1 | 6/2015 | |
| WO | 2015090567 A1 | 6/2015 | |
| WO | 2015096826 A1 | 7/2015 | |
| WO | 2015149742 A1 | 10/2015 | |
| WO | 2015180703 A1 | 12/2015 | |
| WO | 2016019937 A1 | 2/2016 | |
| WO | 2016019942 A1 | 2/2016 | |
| WO | 2016058577 A1 | 4/2016 | |
| WO | 2016095888 A1 | 6/2016 | |
| WO | 2016101942 A1 | 6/2016 | |
| WO | 2016146095 A1 | 9/2016 | |

OTHER PUBLICATIONS

Marcus et al., Solid Freedom Fabrication Proceedings, Nov. 1993.
Cima et al., "Computer-derived Microstructures by 3D Printing: Bio—and Structural Materials," SFF Symposium, Austin, TX, 1994.

(56) References Cited

OTHER PUBLICATIONS

Marcus, et al., Solid Freeform Fabrication Proceedings, Sep. 1995, p. 130-33.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.
Armin Scharf, "Erster 3D-Endlosdrucker", zwomp.de, http://www.zwomp.de/2012/11/06/voxeljet-endlosdrucker/ dated Nov. 6, 2012.
Voxeljet's VXconcept—Continuous 3D printing for sand casting, You-Tube, Nov. 16, 2011, XP002713379, retrieved from the Internet URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".
International Search Report, Application No. PCT/DE2014/000151, dated Jun. 30, 2015.
Written Opinion of the International Search Authority, Application No. PCT/DE2014/000151, dated Jun. 30, 2015.

\* cited by examiner

METHOD AND DEVICE FOR 3D PRINTING USING TEMPERATURE-CONTROLLED PROCESSING

CLAIM OF PRIORITY

This application is a national phase filing under 35 USC § 371 from PCT Application serial number PCT/DE2015/000151 filed on Mar. 27, 2015, and claims priority therefrom. This application further claims priority from German Patent Application DE Number 10 2014 004 692.3 filed on Mar. 31, 2013. PCT Application Number PCT/DE2015/000151 and German Patent Application Number DE 10 2014 004 692.3 are each incorporated herein in their entireties by reference.

FIELD

The invention relates to a method and a device for producing three-dimensional models by means of settable method parameters.

BACKGROUND

A method for producing three-dimensional objects from computer data is described in the European patent specification EP 0 431 924 B1. In this method, a particulate material is applied in a thin layer to a platform, and a binder material is selectively printed onto the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is reached. A three-dimensional object (also referred to as a molded part or model) is thereby produced from the printed and solidified areas.

After it is completed, this object produced from solidified particulate material is embedded in loose particulate material and is subsequently removed therefrom. This is done, for example, using an extractor. This leaves the desired objects, from which powder deposits are removed, for example by manual brushing. This method may be used to process different particulate materials, including natural biological raw materials, polymers, metals, ceramics and sands (not an exhaustive list).

For example, a solid in the particulate material may be used as the binding system. This solid is dissolved by means of a solvent which is expelled from the ink-jet print head. After the solvent evaporates, the particles stick together in the desired locations. The component may be removed from the remaining loose powder after a certain waiting period.

Among other things, powdered water glass (sodium silicate) may also be used as the binding system. This material is dissolved by printing a water-based fluid. Depending on the quantity, this liquid water glass now settles between the particles. Hardening takes place by means of various mechanisms. However, drying the binding fluid is predominantly used. The water glass hardens physically. Other combinations of particulate materials, binders and fluids are also known to those skilled in the art. Drying or evaporating the fluid in 3D printing processes of this type also results in a solidification and formation of a molded part.

The process execution is problematic during the hardening process or drying or evaporating of the fluid. A 3D printing process of this type often results in components having inadequate strength and extreme geometric deviations.

In known 3D printing methods, a process parameter is changed, on the one hand, and the material system is adapted, on the other hand, for the purpose of increasing the strength and improving the surface quality.

WO2012/175072 A1 describes, for example, a method for controlling deposits on the component using various aggregates. For example, cement which absorbs excess water may be used. The water glass content may also be increased.

Both methods have certain disadvantages. The cement absorbs a certain amount of moisture and acts, to a certain extent, as a premature drying process. This is detrimental to the strength.

It is also useful to increase the water glass content in order to positively influence the surface qualities. However, the amount that can be added is technologically limited, and the economic feasibility of the method is negatively influenced.

SUMMARY

The object of the invention is therefore to mitigate the disadvantages of the known 3D methods or to avoid them entirely. In particular, one objective of the invention is to increase the strength of the molded parts produced thereby while maintaining a good size accuracy and/or reducing the variance of the aforementioned properties in components of this type.

This object is achieved by a method for producing 3D components, particulate material being applied in layers to a building platform in a closed build space and printing fluid being selectively applied, and these steps being repeated until a three-dimensional component is obtained, the relative humidity or the relative solvent concentration in the atmosphere in the build space being set to a selected value, and/or the temperature in the build space being set to a selected temperature.

In another aspect, the achievement of the object relates to a device, suitable for 3D printing methods, comprising
  a. a closed build space;
  b. means for setting the relative humidity or the relative solvent concentration in the atmosphere; and/or
  c. means for controlling the temperature of the build space interior.

In principle, the object of the invention is achieved in that the aqueous or fluid solution and the drying or evaporation are controlled by a targeted guidance of the humidity or the solvent. A favorable hardening development is achieved thereby, and components having a desired and regulatable strength are obtained.

The inventors have developed an advantageous method, with the aid of which molded parts having water-based or other fluid-based materials may be produced, which have both advantageous strengths and satisfactory surface qualities.

A number of terms in the invention are explained in greater detail below.

Within the meaning of the invention, "3D printing methods" are all methods known from the prior art which facilitate the construction of components in three-dimensional molds and are compatible with the described process components and devices. In particular, they are powder-based methods, which contain, as one constituent, aqueous solutions and/or other fluid components or solvents which must be removed from the molded part or which escape from the molded part to be produced during or for the solidification thereof. The solidification and quality of the molded part may be influenced by the invention in a targeted manner, other quality features remaining the same or even being positively influenced.

"Printing fluid" is understood to be an essentially aqueous or fluid liquid, which is printable with the aid of ink-jet devices. The printing fluid may be a material mixture, which consists of water and other additives, which influence, for example, the viscosity and surface tension. Agents for preventing the growth of fungal and vegetable matter may also be contained in the printing fluid. Not least, the printing fluid may also contain bindable materials, which result in a certain binding effect in the filler after drying.

All materials known for powder-based 3D printing, in particular sands, ceramic powders, metal powders, plastics, wood particles, fibrous materials, celluloses and/or lactose powders, may be used as "fillers." The filler is preferably a dry, free-flowing powder, although a cohesive, firm powder may also be used.

Within the meaning of the invention, "selective binder application" or "selective binder system application" or "binder fluid application" or "application of the binder fluid" may take place after each particulate material application or irregularly, depending on the requirements of the molded body and for the purpose of optimizing the production of the molded body, i.e., non-linearly and not in parallel after each particulate material application. "Selective binder application" or "selective binder system application" may thus be set individually and during the course of producing the molded body.

"Binder system" is understood to be a material system that is able to bind the particulate material. The binder system comprises at least one "binder fluid" to be printed and possibly other liquid or solid components, which may be present in the binder fluid as well as in the particulate material. The binder system may bind chemically or physically or by means of a combination of a chemical and physical process. The binding action may be triggered or accelerated by adding energy, e.g., in the form of heat or light. In general, all material systems known to those skilled in the art in this connection may be considered as the binder system. For example, a binder system may include a "binder fluid" and a solid "binder," which is contained in the particulate material (build material) and is soluble in the binder fluid. In this case, the solid is dissolved by the solvent, which is expelled from the ink-jet print head and applied to the particulate material. After the essential evaporation or drying of the binder fluid, the selectively printed areas of the build material are bound together. A selective solidification may likewise be produced in the binder fluid and/or the particulate material with the aid of chemical systems known to those skilled in the art.

"Binding agent" is understood to be a powdered component which is essentially soluble in the printing fluid and induces a binding action in the dissolved state, in particular if the binder is in the filler. For example, water glass as well as cement binders are suitable as the binding agent.

"Molded body," "model," "3D molded part" or "component" within the meaning of the invention are all three-dimensional objects that are produced with the aid of the method according to the invention and/or the device according to the invention and which have a nondeformability.

Any known 3D printing device that contains the necessary components may be used as the "device" for carrying out the method according to the invention. Common components include a coater, a build space, a means for moving the build space or other components, a dosing device, a print head, a heat means, a positioning means for batch processes or continuous processes and other components which are known to those skilled in the art and therefore do not need to be listed in greater detail here.

All materials known for powder-based 3D printing, in particular sands, ceramic powders, metal powders, plastics, wood particles, fibrous materials, celluloses and/or lactose powders, may be used as "particulate materials" or as "build materials." The particulate material is preferably a dry, free-flowing powder, although a cohesive, firm powder may also be used.

"Build space" within the meaning of the invention is the geometric place in which the particulate material feedstock grows during the build process by repeated coating with particulate material. The build space is generally delimited by a base, the building platform, by walls and an open cover surface, the build plane. The build plane may be horizontal but also form an angle, for example in continuous methods, so that the layer application takes place obliquely at an angle.

A "build container" within the meaning of the invention implements a build space. It therefore has a base, walls and an open access area, the build plane. The build container always includes parts which do not move relative to the frame of the 3D printing device. Removable build containers, so-called job boxes, make it possible to operate the machine more or less continuously, since the job box may be inserted into and removed from the machine. The parts in a first build operation may thus be unpacked outside the 3D printing device, while new parts may be printed within the machine in a second build container.

According to the invention, the "printing and coater plane" is the abstraction of the location of the building process currently in progress. Since the dosing unit and the coater are structurally moved in the device on a positioning unit with shared components at nearly one height, the "printing and coater plane" is viewed in this description as being situated at the upper edge of a newly applied layer. It may form a horizontal plane or be disposed at an angle.

According to the invention, a "building platform" moves relative to the printing and coater plane. This relative movement takes place during the building process in interrupted movements in the layer thickness. It defines the layer thickness.

"Container wall" or "wall" designates a barrier to the particulate material. The particulate material is unable to travel from one side of the wall to the other.

In this publication, a "seal" designates two structural elements which prevent a passage of the particulate material through contact points between walls moving relative to each other or between walls and the building platform.

The "geometric component limit" designates an abstraction of a component in the build material. The part produced during the build process deviates from the geometric component limit, due to the discrete nature of the build material particles.

The "retention system" is located at the interface between the ventilation system and the particulate material feedstock. Its function is to trap the particles present in the air current. It may be designed as a screen mesh or as a porous body. 3D-printed bodies may also be used as a retention system. It is immaterial whether they have already been completely dried. Bodies of this type may also be produced by the building process.

A "controlled air flow" within the meaning of the invention is an air current, which is conducted through the build material in a defined manner or, in any case, is purposefully introduced into the applied build material from the outside and flows through the applied build material for the purpose of more quickly removing the solvent vapors (binder fluid vapors). This reduces or essentially dries the binder fluid in the applied build material. The "controlled air flow" may be simple ambient air, which is preferably temperature-controlled, preferably heated, or it may be a defined gas mixture.

"Controlled air current" or "controlled air flow" may also be referred to as "forced ventilation" and is a particular form of controlled air flow. The free convection in the build material is, in a sense, the opposite of forced ventilation. In this case, vapors may be removed only through diffusion, due to concentration gradients. In the case of forced ventilation, the vapors, i.e. the solvent vapors or binder fluid vapors, are controlled by an air current and selectively moved or removed from the build material.

"Temperature control" or "temperature control of the air current" means that the air introduced into the build space or the gas mixture is set to a specific temperature, or the build space is set to a selected temperature.

According to the invention, "relative humidity" refers to the fact that the air or gas flow present in, introduced into or conducted through the build space has a humidity which is set to a desired value. This may affect not only the humidity but also the relative solvent content.

"Reduced or essentially dried" with regard to the binder fluid means that the quantity of binder fluid is reduced during the selective application, compared to the direct application of binder fluid. The binder fluid is preferably reduced to the extent that the produced component has a strength that makes it stable to the extent that it may be unpacked easily and without problems. "Essentially dried" means that the component does not contain any binder fluid or only remnants thereof. According to the invention, the process of "reducing" or "drying" the binder fluid is advantageously accelerated and purposefully controlled with the aid of a "controlled air flow" with regard to the time and quantity of the binder fluid reduction.

"Proceed layer by layer" within the meaning of the invention designates the process of lowering the build space by the thickness of one layer or raising device parts located above the build space by the thickness of one layer in a job box or in another horizontal build plane. In a continuous method, "proceed layer by layer" designates the moving of the applied build material (the build material block in the print machine) by the thickness of one layer, so that a new layer of particulate material may be applied and a layer application and selective binder fluid application may thus take place continuously.

"Flow through in a time-controlled manner" within the meaning of the invention means that the controlled air flow during the method is carried out at a defined point in time and over a defined period of time, and the controlled air flow may take place regularly or irregularly during the method.

"IR heating" in this publication means an irradiation of the build space using an IR emitter. The emitter may be static, or it may be moved over the build space with the aid of a positioning unit.

"Drying" is understood to be a loss of a certain volume of water or another fluid substance. This drying is brought about by the release of moisture or another fluid substance to the ambient air. The drying action may be combined with a hardening.

"Hardening" is the term for the increase in the strength of a component. Hardening in water glass-based systems may take place by drying or chemical hardening.

According to the invention, the terms drying and hardening are not understood to be synonymous.

"Dissolution" is understood to be the process of dissolving or beginning to dissolve the binding agent in the printing fluid. The dissolution process is dependent on different factors, for example the reaction duration, the temperature, the relative water quantity and, e.g., the type of water glass.

"Setting the climatic conditions in the build space" means that the temperature and/or the relative humidity or the relative solvent concentration in the atmosphere in the build space is varied or selected in such a way and set through suitable means in such a way that the drying or hardening process in the component to be produced proceeds within a desired time window, and advantageous component properties are thus achieved.

In one preferred specific embodiment of the method according to the invention, the climatic conditions in the build space may be set in such a way that the evaporation rate of a printed binder fluid or a volatile constituent is controllable in the 3D component to be produced. The temperature is preferably set to a suitable range or a particular temperature in the build space with the aid of suitable means, and/or the atmosphere of the build space is enriched with a suitable agent, an air current enriched with the agent evaporating from the 3D molded part to be produced (water or another volatile substance, preferably a known solvent used in 3D printing) is preferably introduced into the atmosphere of the build space. The evaporation rate may thus be advantageously controlled.

In the method according to the invention, the evaporation rate of the printed binder fluid or a volatile constituent thereof is furthermore advantageously reduced with respect to the conditions at room temperature (preferably 21° C.) and the ambient humidity. The reduction or, alternatively, the increase is preferably at least 50%, preferably 50%-90%, more preferably 50%-70%, even more preferably 60%-80%.

In another preferred specific embodiment, the relative humidity or the relative solvent concentration is set to a value of more than 40%, preferably between 50% and 90%, more preferably 50% and 80%, even more preferably 55% and 70% of the relative humidity or relative solvent concentration.

It may furthermore be advantageous if the temperature in the build space is regulated. The same temperature may be retained throughout the entire manufacturing process, or [sic; it] may be varied in steps during the course of production. The temperature is preferably set to a value from 10° C. to 50° C., preferably from 15° C. to 40° C., more preferably from 30° C. to 35° C.

Air currents oriented in the build space are preferably applied, which preferably have a predetermined temperature and/or a predetermined relative humidity or a relative solvent concentration, as described above.

In principle, the method according to the invention may be used with all known 3D printing methods and material systems which contain an aqueous or volatile component, and demonstrates advantages in the 3D components obtained thereby. The particulate material is preferably selected from the group comprising sand, metal, polymers, ceramic, wood, cellulose, lactose, salts, carbon, hard materials (WC), glasses, cement and gypsum.

In the method according to the invention, any known fluid substance may also be used as the printing fluid or the binder fluid. The printing fluid is preferably selected from the group comprising water, alcohols, esters, ethers, acetates, ketones, amides, aldehydes, benzene, acrylates, styrene, epoxies, polyols, isocyanates, novolaks, resols, polyesters, peroxides, succinates, aromatics, aliphatics and hydrocarbons.

A material system is preferably used in the method according to the invention, which includes a water-soluble binder as the powdered binding agent and water-insoluble particles and a water-based binder fluid in the particulate material.

The device which may be used for the method according to the invention has already been described above and may have the following preferred features:

The build space is preferably tightly sealable, whereby the regulation of the temperature and/or the relative humidity or the relative portion of another component may be set more easily and more constantly.

Means known to those skilled in the art may be used to regulate the temperature and set the relative humidity in the build space. The means for setting the relative humidity may be preferably selected from the group comprising a water-based humidifier or a solvent evaporator.

The means for controlling the temperature of the build space interior is preferably selected from the group comprising an air heating unit or an IR emitting unit.

The device according to the invention may furthermore include means for controlling one or multiple air currents in the build space interior, preferably for controlling one or more air currents over the build space.

Means for controlling one or multiple air currents in the build space interior may be selected from pipes, diffusors, nozzles and/or baffle plates.

The device according to the invention is designed in such a way that it is suitable for the material systems described above as well as for the stated materials and their combinations.

The device according to the invention may preferably also include an insulation for minimizing or avoiding undesirable convection movements.

DETAILED DESCRIPTION

Figure 1:
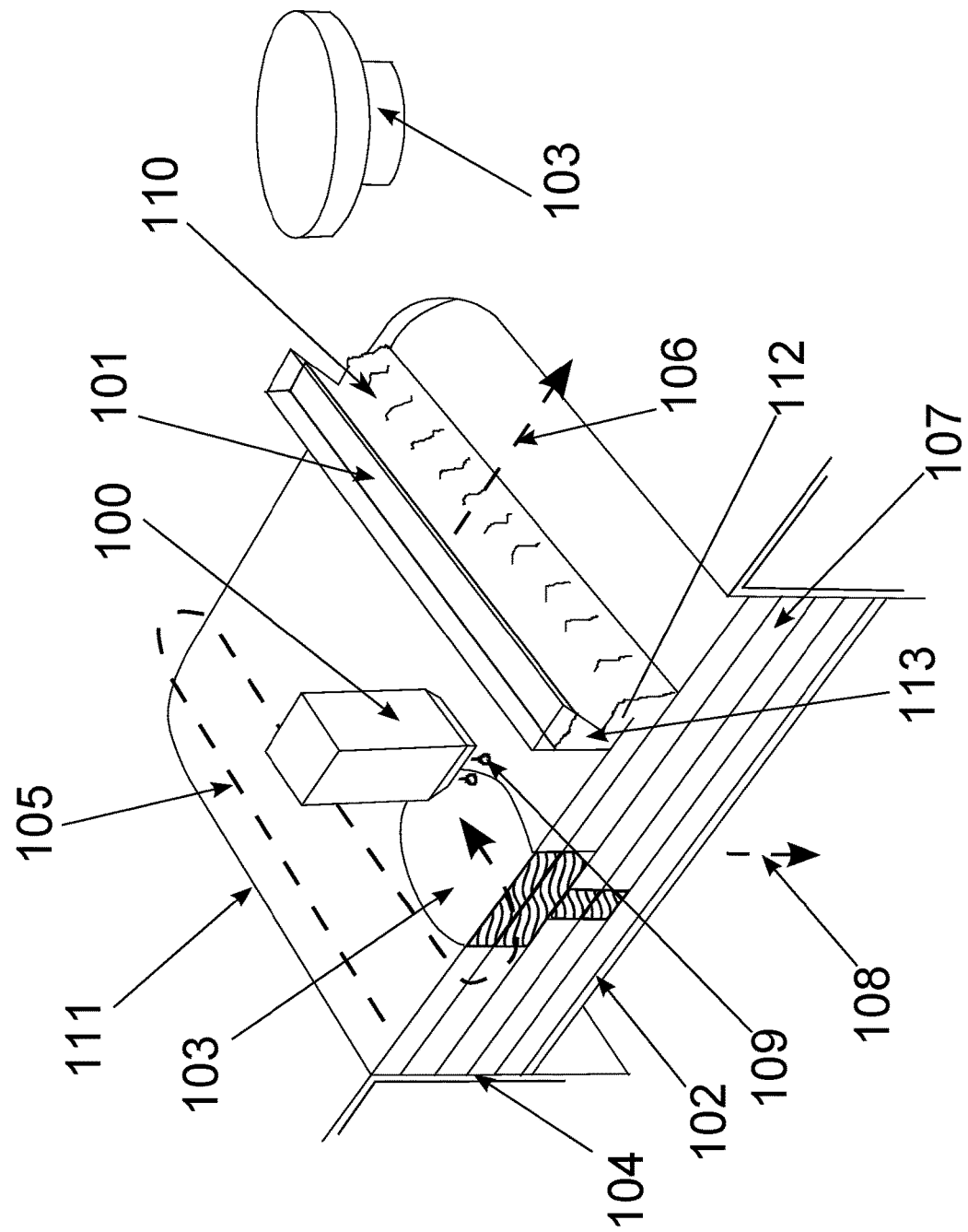
FIG. 1: shows a schematic representation of the components of a powder-based 3D printer as a sectional isometric view.

The basic components correspond to a system for building models in layers with the aid of ink-jet printing technology, as known to those skilled in the art and which therefore do not need to be repeated in every detail here.

The sequence is preferably organized as follows: A layer of particulate material is applied to a building platform and leveled. A printing fluid is then printed onto the layer according to the layer data of the 3D model. The essential portion of the material for bonding the particles is provided in the powder in the form of dry particles. The dissolution process may now be accelerated by heating with an IR lamp. After the printing and heating process, the building platform is lowered, and the process begins all over again.

These steps are repeated until the component is completely present in the constructed powder cake.

The quality of the components produced in this manner is evaluated on the basis of different criteria. For example, the strength is of critical importance for later use as a core or mold in a foundry. It determines how easy it is to handle the component or whether the core will survive the casting process without breaking.

Another essential variable is the surface quality. During the foundry application, for example, the surface of the printed component is reproduced directly on the cast part. The size accuracy is also important. Only size-accurate components may be processed into an industrially useable part in the remaining steps.

In a so-called water glass material system, the strength and surface properties are in a certain opposition to each other, as tests have shown. Very strong components are easily achievable using the procedure described. These parts are printed with a high proportion of liquid and have poor surfaces after the process.

Good surfaces may also be achieved. However, the component is then very fragile and may be handled or shipped only with difficulty.

This contradiction arises from the circumstance that the water glass takes time to dissolve. During this time, the printed liquid may travel across the boundaries of the geometrically desired shape, due to the capillary effect in the component, and generate undesirable deposits on the component. These deposits occur in the form of efflorescence on the component wall. If the dissolution were to take place faster, the viscosity of the printing fluid would increase more rapidly in the particulate material, the penetration of the printing fluid into adjacent areas would decrease, and better surfaces would thus be achievable.

In devices according to the prior art, the particulate material is heated with an IR lamp after being applied to increase the dissolution speed. As shown in tests involving dry water glass, this causes the viscosity of the printing fluid to increase rapidly, and the components have better surfaces.

Despite this procedure, some particulate materials (e.g., some sand types) may not be satisfactorily processed using this method.

Tests involving devices according to the prior art have shown that drafts may have a significant negative impact on the process. The customary strengths may not be achieved. The surfaces, however, appear to be good.

The inventors have now determined that this is due to the fluid drying out too fast. In this case, only a small portion of the printing fluid is active during the dissolution, and insufficient strength results.

The inventors have now developed a method in which the drying of the printing fluid from the particulate material is decelerated by means of additional humidity in the process chamber. The temperature may be preferably increased with the aid of an IR lamp or other suitable means, and even more material may be caused to dissolve. A controlled air current is preferably conducted over the build space.

Tests have shown that improved strengths may be achieved, compared to the prior art, by using a system of this type. Very good surfaces may simultaneously be achieved, despite the high strengths.

The process window may be greatly enlarged with the aid of the invention by combining a heat source, such as an IR lamp for heating the fluid, with the creation of a moist atmosphere.

With the aid of the invention, and by increasing the humidity, materials may thus be processed which previously were unable to be used or only with a reduced quality of the molded parts. These materials include fine sands, sands having an unusual grain shape and special fillers having a high specific weight.

The system according to the invention draws heavily on powder-based 3D printing. The mechanical engineering is augmented to meet the requirements according to the invention.

The device according to the invention includes a powder coater (101). Particulate material is applied thereby to a building platform (102) and smoothed (FIG. 2(a)). The applied particulate material may comprise a wide range of materials. For example, fillers such as sands, artificial sands and ceramic particles may be used. The flow characteristics of these materials may vary enormously. Different coater techniques permit layering, from dry, free-flowing powders and cohesive, firm powders to fluid-based dispersions. The height of powder layers (107) is determined by building platform (102). It is lowered after one layer has been applied. During the next coating operation, the resulting volume is filled and the excess smoothed. The result is a nearly perfectly parallel and smooth layer of a defined height.

Figure 2:
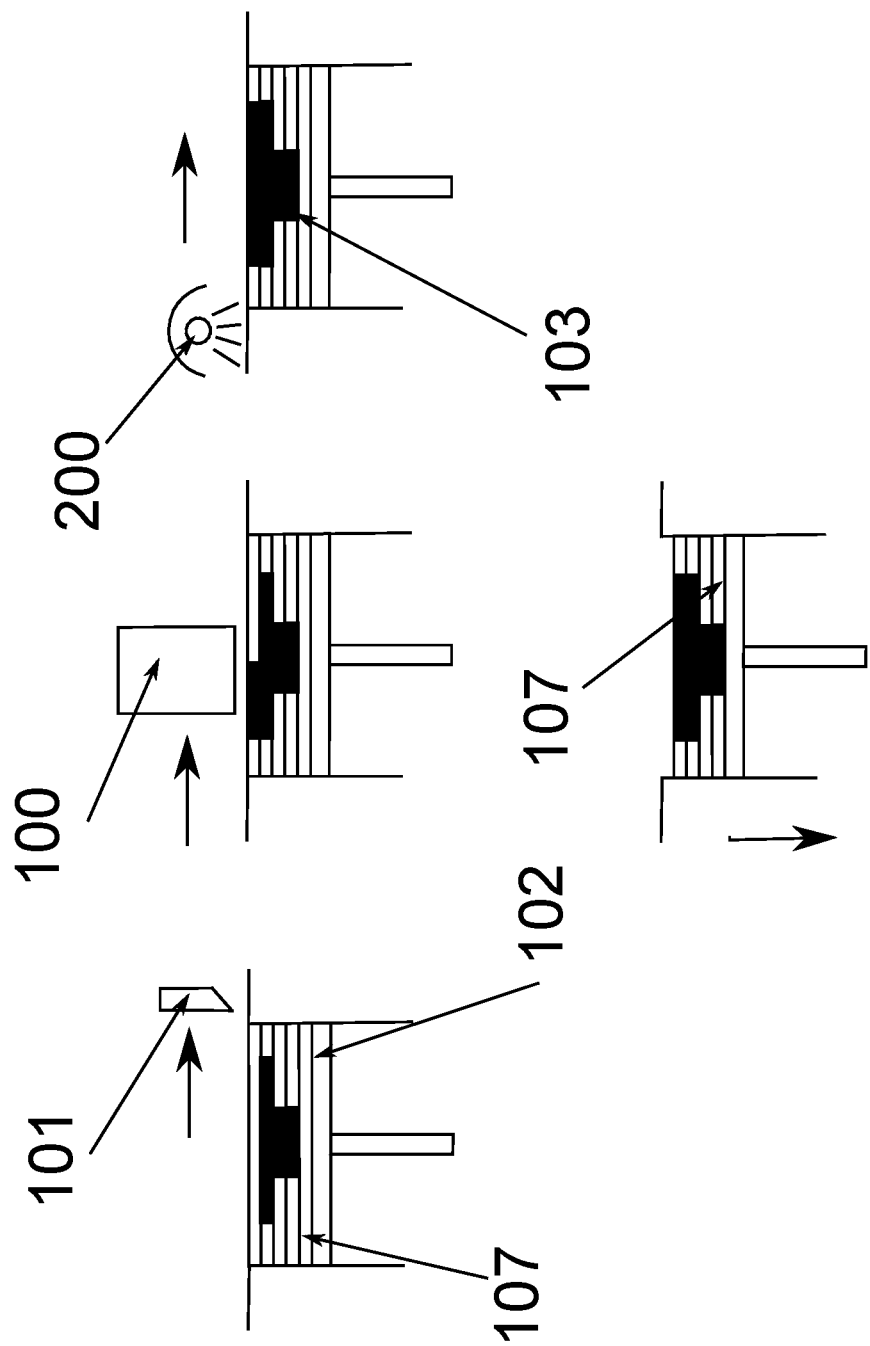
FIG. 2: shows a diagram of the sequence of a conventional 3D printing process.
Figure 3:
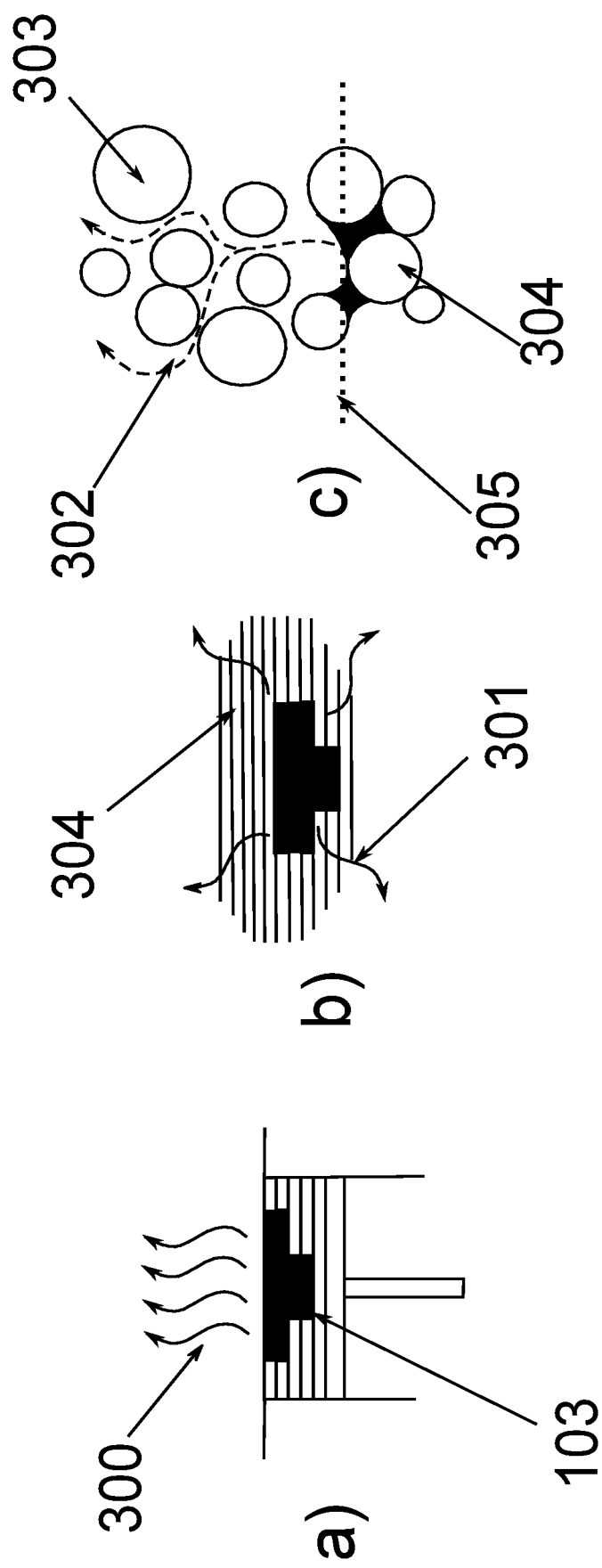
FIG. 3: shows the drying process using forced convection.
Figure 4:
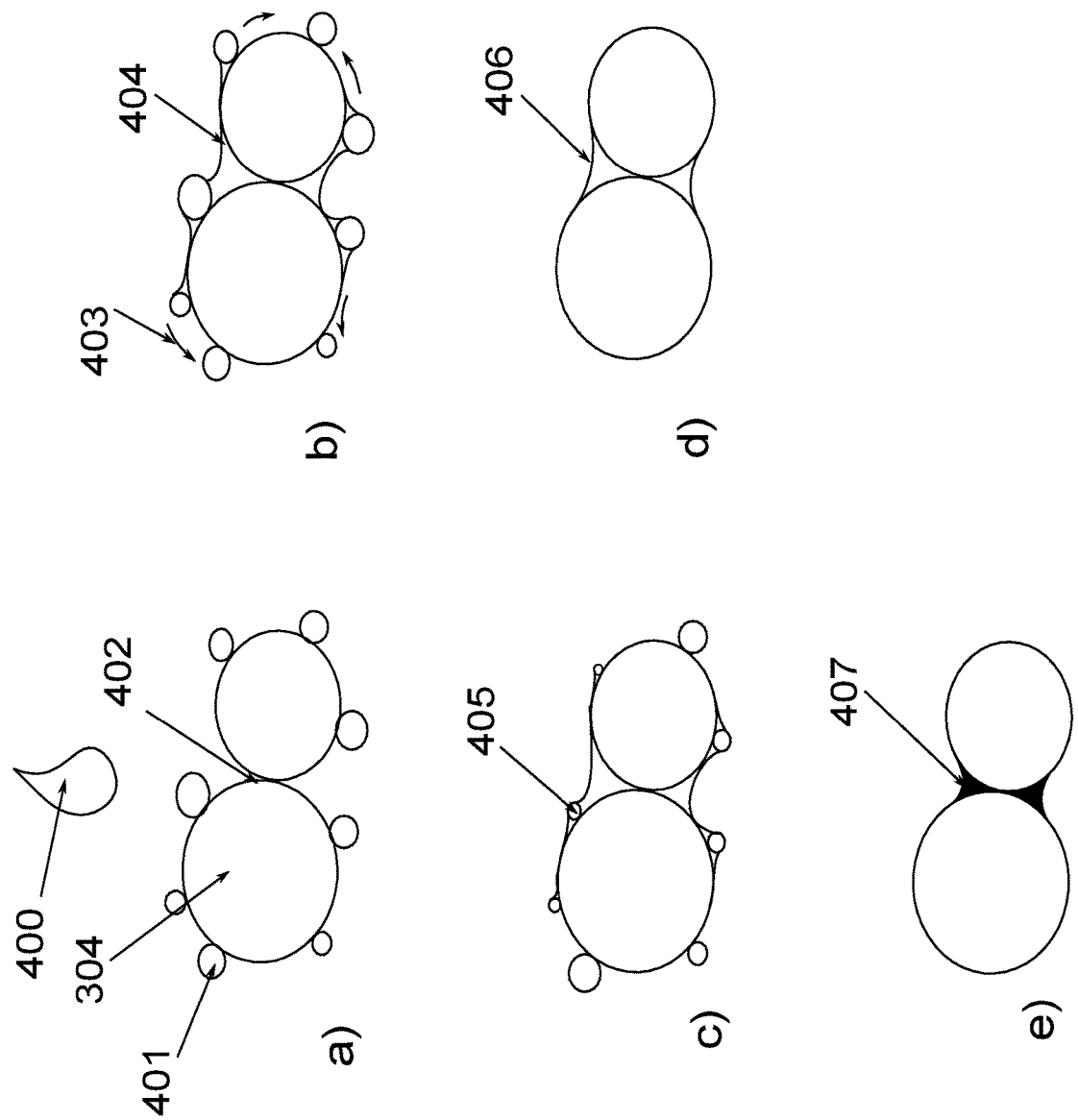
FIG. 4: shows an illustration of the dissolution process.
Figure 5:
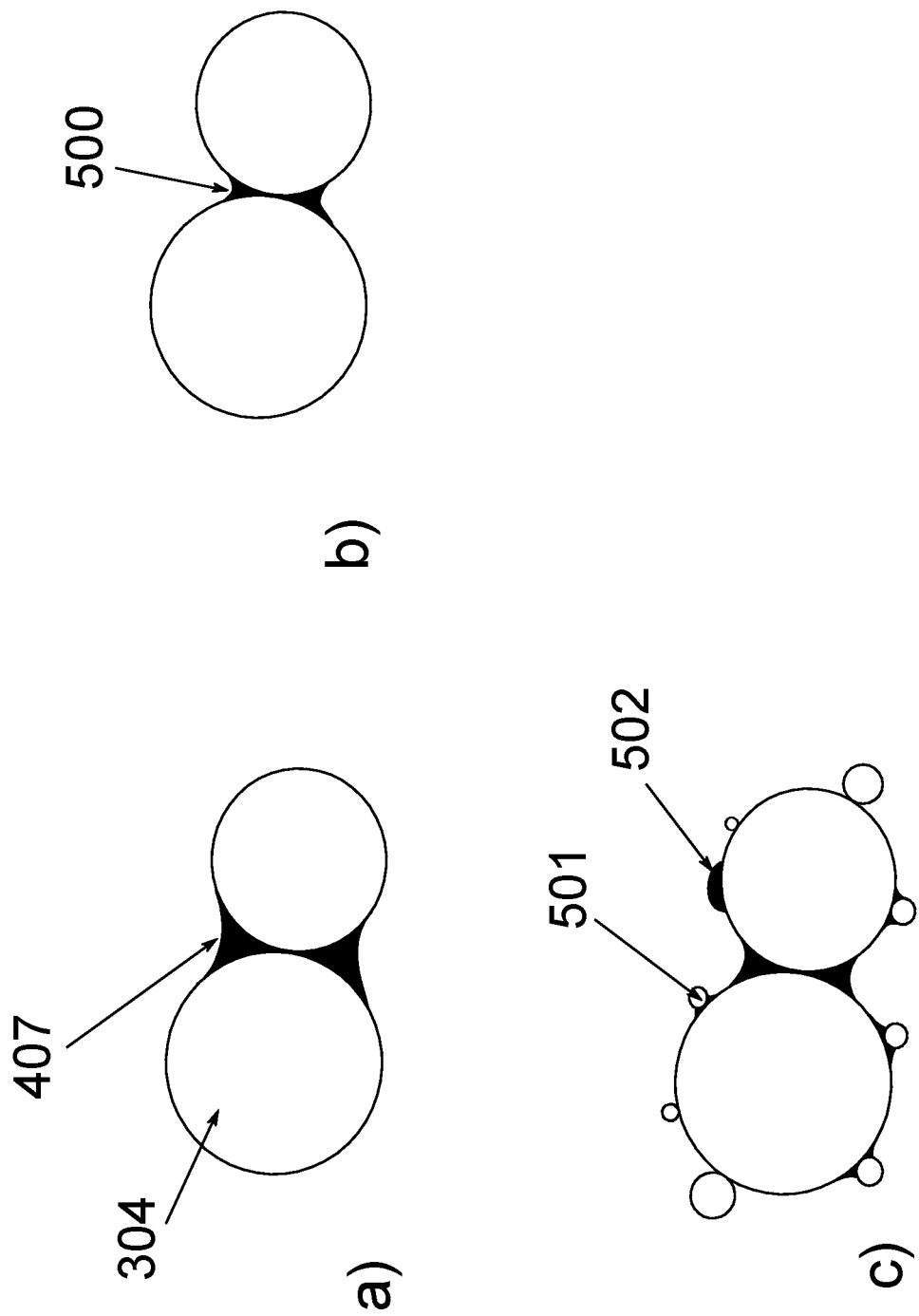
FIG. 5: shows different binder bridge designs.

After a coating process, a printing fluid is printed onto the layer with the aid of an ink-jet print head (100) (FIG. 2(b)). The print image corresponds to the section of the component at the present build height of the device. The fluid strikes and slowly diffuses into the particulate material.

After the binder is printed, the layer may be heated (FIG. 2(c)). For this purpose, an IR emitter (200), for example, may be passed over the build space. This IR emitter may be coupled with the axis of the coating system. Part of the liquid binding agent is evaporated during heating.

At the end of this heating process, building platform (102) is lowered by the thickness of one layer. The steps of layer construction, printing, heating and lowering are now repeated until desired component (103) is completely produced.

Component (103) is now completely present in powder cake (602). Depending on the physical or chemical process on which the binding of particles (303) is based, the component is now more or less solidified. The component is usually in a soft state immediately after printing.

This state is not a problem as long as component (103) remains in powder (107), supported by the surrounding particulate material. However, once the component is unpacked from the powder, a geometric deformation is unavoidable, due to gravity and other effects of force.

The component is therefore typically left in the powder. Excess binding agent (301), which does not allow component (103) to solidify, now evaporates via various vapor channels (302) in unbound particulate material (303). The bonds of bound particulate material (304) in geometric component limit (305) solidify more and more. After a certain waiting time, body (103) is sufficiently solid to be able to be unpacked.

With a material system according to the invention, which has a water glass-based binding agent, the parts may be unpacked relatively quickly after printing. Waiting periods of less than 2 hours have to be maintained in this case, thanks to the heating with IR lamp (200).

The solidification process takes place as follows: Printing fluid (400) strikes particulate material (304, 401) and penetrates the powder, due to the capillary action. The printing fluid continues to penetrate farther and farther in a space to be approximated as a sphere (403).

Within the particulate material, the printing fluid wets both passive filler particles (304) and water glass grains (401). The water glass is present in fine, discrete particles (401), which are nearly evenly distributed, due to an intensive mixing of the material.

The wetted water glass grains (404) gradually begin to dissolve, due to the liquid binder, lose diameter (405) in the process and increase the viscosity of the printing fluid. In this stage, the dissemination speed of the fluid quantity decreases.

The wetting in this stage, with an adapted quantity of printing fluid, is sufficient to the extent that the individual gaps between the filler particles are in contact with each other via the printing fluid (404). The entire water glass ideally dissolves, and a homogeneous liquid (406) results.

In the next stage, moisture is removed from the thickened printing fluid by storing the component in the particulate material. This fluid is partially absorbed by the very dry powder environment.

The removal of moisture ensures that the fluid continues to thicken. This moisture is drawn back into the areas between the filler particles, due to the capillary action. It continues to dry out here, until a solid water glass bridge (407) remains in the end. Particles (304) are thus bound, and a solid body is produced.

While the water glass grains are in most cases partly dissolved, the increase in viscosity is not sufficient to prevent the further dissemination of the fluid. This results in deposits on the component. Counteracting this effect by adding less fluid is not expedient, since no sufficient binder bridges (500) and thus strengths are then able to form. Instead, this effect may not be counteracted by varying the quantity of printing fluid, since coordinated quantities of water with regard to the total quantity of water glass may be reasonably defined only in the fully dissolved state. In the initial stage when little material has been dissolved, an excess of water [sic; is] always present.

It is therefore reasonable to increase the dissolution speed. Heating with the aid of an IR lamp is effective here. The phase of water excess is now much shorter than before. On the other hand, the influence on the viscosity may be disregarded.

However, the steam pressure of the printing fluid is also increased by the heating. A large quantity of printing fluid evaporates as early as during the creation of the layers. Likewise, moisture is rapidly removed from the component by the dry, surrounding powder. The accelerated dissolution process is aborted too quickly, due to an excessively massive thickening of the printing fluid, and incomplete bindings between particles (500) occur. Part of the water glass is still in particulate form in places, which do not contribute to the strength of the component (501, 502).

This evaporation process may be counteracted by regulating the humidity and the temperature in the build space according to the invention. This means that the air in the closed build space is regulated to a temperature range of 18° C.-40° C., preferably 30° C.-35° C., and the relative humidity is then regulated within a range of 40%-70%, preferably 60%-70%. The temperature and humidity may be regulated, for example, by means of an external air conditioning unit, corresponding sensors for temperature and humidity being accommodated in the process chamber. The process air guided via the air conditioning unit should then be preferably blown into the process chamber draft-free via corresponding diffusors.

Due to the high partial pressure of the water in the ambient air, the rate of evaporation from the particulate material decreases. In addition, the particulate material is continuously humidified, since the water glass particles have a highly hygroscopic effect.

This prevented evaporation makes it possible to be able to quickly dissolve large amounts of water glass due to the temperature. Nearly ideal bindings (407) may occur. The ratio between strength and surface quality is much better than without the humidification, as the tests show.

Up to now, only special sands have been suitable for binding with dry water glass. For example, spherical river sands having a special surface texture are suitable. Artificial sands may also be processed. Both materials are expensive to procure and are therefore not suitable for widespread use.

A much broader range of particulate materials may now be processed using the method according to the invention. These include sand of the Strobel GS14 and GS09 type, which deliver too little strength with an acceptable surface without the method according to the invention. In conventional printing methods and with an acceptable surface, the flexural strengths of these sands are less than 90 N/cm$^2$. This strength is insufficient for safe cleaning and transport of the components. With the humidification according to the invention, and without any changes to the sand recipe, the same sands may achieve a strength of 290-300 N/cm$^2$.

Particularly sharp-edged, broken materials benefit from this increase in strength. The use of olivine sand is thus possible only by means of this measure.

However, the measure is equally effective in the case of special molding materials. In this case, significant strength increases may also be achieved, which expand the range of applications to more and more complex shapes.

The device according to the invention is based on a 3D printer according to the prior art. At least one mobile or stationary IR emission source must be present.

The air conditioning of the build space goes beyond the prior art. A regulated humidification system must be used here. A heating element in water may be used as the moisture source. The moisture measured in the build space then determines the power of the heating element.

The moist air is distributed, for example, via fans. Drafts over the build space should be minimized. Otherwise, too much water will be removed from the freshly printed layer, despite the high humidity.

The moist air is guided to the vicinity of the build space via pipes or guide plates.

A coupling of this regulating system with the print controller of the machine is particularly preferred. The droplets generated by the ink-jet print head may be included in the moisture regulation.

Combining the moisture regulation with a temperature regulation is also preferred. The temperature in the powder bed may thus be controlled much more precisely with the aid of the IR lamp. Better reproducible print results are thus possible.

The advantages of the process according to the invention may be used for all material mixtures in which water-based printing fluids are used, for the purpose of selectively dissolving essentially water-soluble, powdered binding agents to bind surrounding fillers with the aid of a subsequent drying process. The invention is therefore not limited to water glass-based binders but may also be used, for example, for gypsum-based or cement-based binders.

LIST OF REFERENCE NUMERALS

100 Print head
101 Coater
102 Building platform
103 Component
104 Build container
105 Print head path
106 Coater path
107 Powder layers
108 Direction of building platform movement
109 Dosed droplets
110 Powder roll
111 Build space boundary
112 Coater gap
113 Coater stock
200 IR emitter
300 Evaporating material in an open layer
301 Material evaporating into the powder
302 Possible vapor channel
303 Unbound particle
304 Bound particle
305 Geometric component limit
400 Fluid droplets
401 Water glass particles
402 Gaps between passive particles
403 Diffusion direction of the fluid
404 Liquid film with connection between the water glass grains
405 Water glass particle reduced in size by dissolution
406 Thickened solution
407 Solid binding
500 Weak binder bridge
501 Bridge with water glass particles not involved in the binding
502 Ineffective drying

What is claimed is:

1. A method for producing 3D components comprising the steps of:
    applying a particulate material in layers to a building platform in a closed build space and
    selectively applying a printing fluid,
    wherein the applying and selectively applying steps are repeated until the three-dimensional component is obtained, wherein the method includes flowing an air through the closed build space and the air in the closed build space is regulated to a temperature of 15° C. to 40° C. and relative humidity of 50% to 90%;
    wherein
    the particulate material includes water-insoluble particles;
    air currents in an interior of the build space are controlled with a pipe, a diffusor, or a baffle plate;
    the method includes measuring a moisture level of the closed build space; and
    the method includes drying a water glass binder from a dissolved state to form water glass bridges that bind together the particulate material to form the three-dimensional component.

2. The method according to claim 1, wherein the printing fluid comprises an aqueous binder, and one or more climatic conditions in the build space is set in such a way that an evaporation rate of the water is controllable in the 3D component to be produced.

3. The method of claim 2, wherein the evaporation rate of the water is reduced with respect to the conditions at room temperature (21° C.) and at a humidity outside the closed build space.

4. The method of claim 1, wherein the temperature is set to a value from 18° C. to 40° C.

5. The method of claim 4, wherein the temperature is set to a value from 30° C. to 35° C.

6. The method of claim 1, wherein the particulate material is selected from the group consisting of sand, metal, polymers, ceramic, wood, cellulose, lactose, salts, carbon, glasses, cement and gypsum.

7. The method of claim 1, wherein the particulate material includes a water-soluble binder as a powdered binding agent and water-insoluble particles.

8. The method of claim 1, wherein the air currents have a predetermined temperature and a predetermined relative humidity.

9. The method of claim 8, wherein
the particulate material is selected from the group consisting of sand, metal, polymers, ceramic, wood, cellulose, lactose, salts, carbon, hard materials, glasses, cement and gypsum; and
the printing fluid comprises aqueous binder selected from the group consisting of water, alcohols, esters, ethers, acetates, ketones, amides, aldehydes, benzene, acrylates, styrene, epoxies, polyols, isocyanates, novolaks, resols, polyesters, peroxides, succinates, aromatics, aliphatics and hydrocarbons.

10. The method of claim 8, wherein the 3-D components are built in a device having an insulation.

11. The method of claim 1, wherein the build space is tightly sealed so that the relative humidity and the temperature are more constant and more easily regulated.

12. The method of claim 1, wherein the printing fluid comprises an aqueous binder that includes a water-soluble binder, wherein the water-soluble binder is a powdered binding agent dissolved in water.

13. The method of claim 12, wherein the particulate material includes a metal, a polymer, a ceramic, a wood, a cellulose, a lactose, a tungsten carbide, a glass, a cement, or a gypsum.

14. The method of claim 1, wherein a temperature of an interior of the build space is controlled by an air heating unit or an IR emitting unit.

15. The method of claim 1, wherein the method includes adding moisture using a humidification system having a moisture source.

16. The method of claim 1, wherein
the particulate material is selected from the group consisting of sand, metal, polymers, ceramic, wood, cellulose, lactose, salts, carbon, glasses, cement and gypsum; and
the particulate material includes the water glass.

17. A method for producing one or more 3D components comprising the steps of:
applying a layer of particulate material, including water-insoluble particles, to a building platform in a closed build space; and
selectively applying an aqueous binder comprising a water glass binder,
wherein the applying and selectively applying steps are repeated until a three-dimensional component is obtained;
wherein the method includes drying the water glass binder from a dissolved state to form water glass bridges,
the water-insoluble particles are bound together by the water glass bridges to form the three-dimensional component, and
an air in the closed build space is temperature and humidity regulated;
wherein an air in the closed build space is regulated to a temperature of 15° C. to 40° C. and relative humidity of 50% to 90%;
wherein the method includes adding moisture into the closed build space by blowing air from an air conditioning unit into the closed build space using diffusers.

* * * * *